7810X

E. Johnson.

Railroad Track.

Patented Nov. 19, 1833.

THE GRAPHIC CO. PHOTO-LITH. 39 & 41 PARK PLACE, N.Y.

11/19/1833 1810 X

Nov. 19. 1833

Elisha Johnson, of Rochester New York

Letters Patent.

The Schedule referred to in these Letters Patent, and making part of the same, containing a description in the words of the said Elisha Johnson himself of his improvement, in the construction of Rail Roads.

To all to whom these presents shall come.

Figure 1:
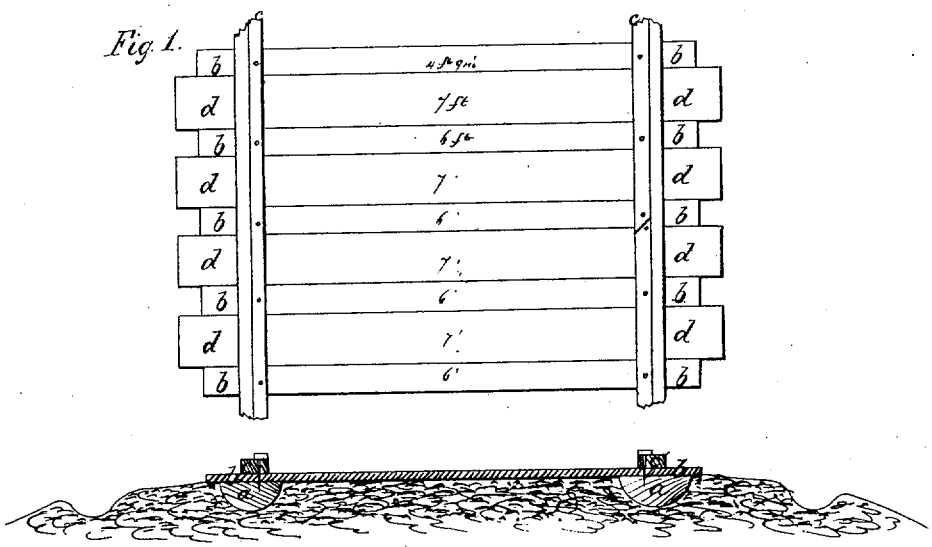
Figure 2:
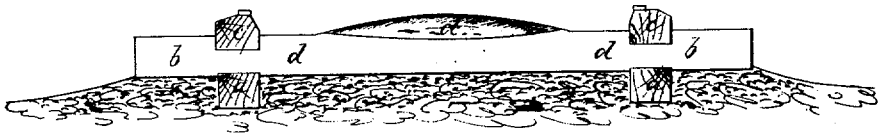
Figure 2:
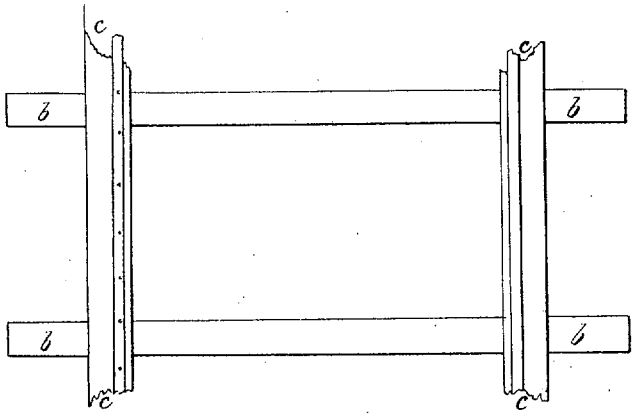

Be it known that I Elisha Johnson, of the village of Rochester, County of Monroe & State of New York, have invented a new & useful improvement in the plan & form of putting down the timber work in the construction of Rail Roads, which has not heretofore been used or known. Fig. 1. Represents the improvement claimed a.a. Sleepers of round timber sawed in the center of any size, or round timber hewed on one side, or of any other description or form of timber. Fig 2 Represents the usual form of construction with variations of size and form of timber a.a. longitudinal sills 6 by 8 inches b.b. Sleepers or cross timbers 3 feet apart 5 by 7. c.c. rails of yellow or norway pine 6 by 6 inches prepared in the form represented. d.d.d. Horse path of earth gravel or rubble, placed in the grading or resting on abutments, crib work piles, or any other form of support. b.b. plank of two inches in thickness & 9 feet in length or of any other length or thickness or of any width, bearing up on the sleepers a.a. & grading, forming a continued floor. c.c. rails or furrings to receive the iron plates 3 by 1 inches or of any other size or of any other form or material other than wood to receive the wheels of the cars resting upon a plank flooring e.e. spike plain or ragged to secure the iron and timber work to the sleeper or sill a.a. or by nails, pins, or any other form of securing the aforesaid described materials, the flooring to be covered one inch in thickness with sand or gravel. — The improvement claimed is the form by fig. 1 & 2 combining cheapness of materials simplicity of con= [illegible] [illegible] of strength on [illegible] soil [illegible] the [illegible] of timber resting upon the grade, ~~by a continued plank~~ flooring

1810X claiming protection against the effects of fire as well as any other advantages or benefits resulting therefrom. A further plan corresponding with the above, with explanations, filed in the Patent office. August 3d 1836

Elisha Johnson

Witnesses
A. Whipple
A. Draper

[429 words

Gr in portfolio